Sept. 17, 1968     H. ZÖPNEK     3,401,496
COMPOSITE GLASS PANEL WITH DISPARATE EDGING
Filed June 1, 1966
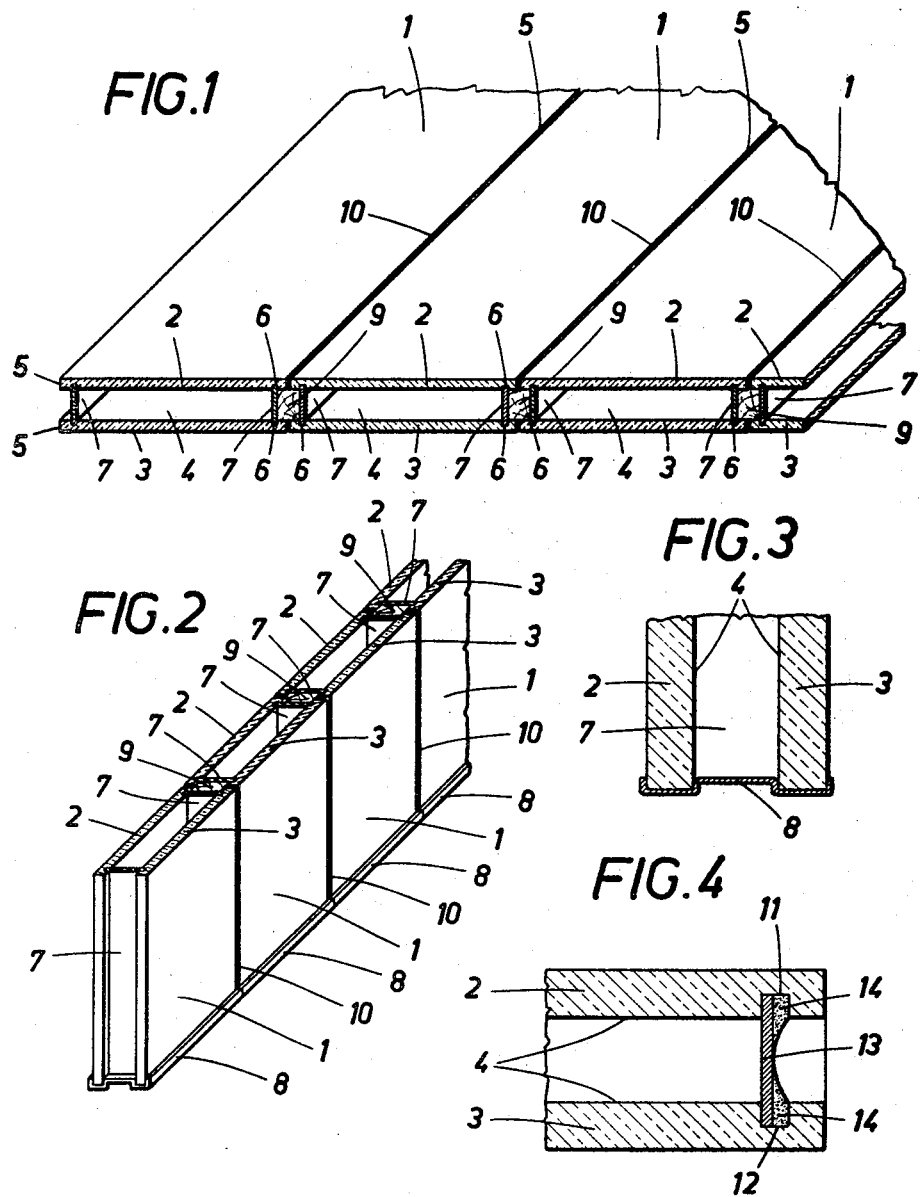
INVENTOR.
HANS ZÖPNEK
BY Kurt Kelman
AGENT

United States Patent Office 3,401,496
Patented Sept. 17, 1968

3,401,496
COMPOSITE GLASS PANEL WITH
DISPARATE EDGING
Hans Zöpnek, Hessenplatz 8,
Linz, Austria
Filed June 1, 1966, Ser. No. 554,458
Claims priority, application Austria, June 15, 1965,
A 5,389/65
3 Claims. (Cl. 52—586)

ABSTRACT OF THE DISCLOSURE

A plurality of juxtaposed box girders are connected into a structure by profiled bars inserted into cavities defined by adjacent edge portions of the box girders. Each girder is formed of two rectangular glass panels connected along two parallel edges by sealing strips while the two end openings of the girder defined by the perpendicularly extending panel edges are closed by detachable covers.

---

This invention relates to an improvement in a composite glass panel as described in my U.S. Patent No. 3,314,204, dated April 18, 1967.

The composite glass panel described in the above-mentioned patent is essentially an insulating glass panel, which is provided with sealing strips extending into grooves around the entire periphery of two spaced apart, parallel glass sheets and sealing the space between the sheets from the outside air as hermetically as possible. The provision of the grooves improves the holding of the sealing strips and enables a hermetic seal of the space between the sheets to be provided by simpler means than before.

Structural glass elements are known which can be assembled to form structures having a large surface without need for mounting frames for each element. The most widely known elements of this type consist of wire glass channels. Various types of glass walls may be assembled if the elements are arranged with abutting flanges and aligned webs, and only the flanges are secured to each other by holders, or similar profiled glass members are mounted over the open sides of the channels so that cavities are formed between similar profiled glass members facing each other. This has the advantage that the individual elements of construction can be cut from continuous stock to the required length. The basic disadvantage of these known elements resides in the fact that high stresses are set up in the glass during the manufacture of the elements, the manufacture of the profiled stock is in any case expensive and complicated, and wall or the like structures assembled from such profiled glass elements are translucent but not transparent. Besides, special means must be provided for embedding the elements at the ends of their length, e.g., in the plaster of a wall. Owing to the difficulties involved in their manufacture, such elements are available only in very few standardized widths, which restrict the possibilities of designing a given structure and selecting the arrangement of wall openings.

A composite glass panel according to the invention is essentially characterized in that the grooves or the like are provided adjacent to the two longitudinal edges of the elongated glass sheets and the sheets are connected by the sealing strips or the like to form a box girder glass element. In a development of the structure of the above-mentioned patent, the sealing strips or the like are used to assemble glass sheets so as to form structural glass elements.

The composite glass panel according to the invention may be used for the same purposes as the known structural elements of the type described hereinbefore and has the important advantage that it can be made from normal flat glass sheets. depending on the intended purpose, it is possible to use glass sheets of different thickness, reinforced or unreinforced glass sheets, colorless or colored glass sheets. For reasons of strength, safety or appearance, different glass sheets may be combined. The grooves may be formed in the sheets by rolling during the manufacture of the sheets. In practice, however, it will be preferred to form the grooves or the like by grinding with diamond wheels so that various commercially available glass sheets can be used in manufacturing the elements. This method enables a manufacture of structural glass elements in various standardized widths from similar flat glass sheets. The anchoring of the sealing strips in the grooves ensures a reliable retention of the glass sheets against a displacement in the plane of the sheet so that a structural glass element of high quality is obtained. Means for anchoring the sealing strips may comprise simple interlocking joints between the sealing strips and the glass sheets as well as bonding joints, in which the sealing strips are held in the groove by adhesive, putty or other cement, or are flowed into the groove. A particularly effective anchoring of the glass sheets relative to each other and against forces acting transversely to the plane of the glass sheets can be obtained if the sealing strips or the like interengage with grooves which are undercut in dovetail form at least on one side. For this purpose the sealing strips may be enlarged or angled at the end and the groove portions which are left free may be filled with a putting compound, which may be cold-curing. Alternatively, the sealing strips may conform to the profile of the flaring grooves and be slidingly inserted from the length end of the grooves. Finally, elastically deformable sealing strips having a sectional shape which conforms to that of the grooves may be snapped into the grooves. Depending on the intended purpose, various materials may be used for the sealing strips. For instance, the strips may be made from glass or metal or various plastics materials.

Further details and preferred embodiments of the invention will become apparent from the following description of the accompanying drawing, in which FIGS. 1 and 2 are perspective views showing two wall portions made with composite glass panels according to the invention, FIG. 3 is an enlarged sectional view showing the lower end of a composite glass panel, and FIG. 4 is a transverse sectional view showing a modification of the composite glass panel.

According to FIGS. 1 to 3, composite glass panels 1 are assembled to form a larger wall portion. Each of these composite glass panels, which constitute structural glass elements, comprises two glass sheets 2, 3 of elongated rectangular form. These glass sheets have plane surfaces 4 facing each other, which are formed with ground, rectangular grooves 6, which are closely spaced from the outside edges 5. These grooves engage with the longitudinal edges of continuous sealing strips 7, which act as spacers and may be secured in the grooves by adhesive, putty or other cement, or the like. The glass sheets 2, 3 and the strips 7 combine to form self-contained box girders. Profiled end covers 8 close the end openings of these box girders. In practice, the end cover 8 at one end of a prefabricated element will be fixed, e.g., by adhesive, whereas the other end cover will be detachably mounted. Additional loose profiled end covers may be supplied with the structural elements so that the element can be cut to the required lengths and the openings of the resulting elements can then be closed. The end covers 8 may consist, e.g., of metal or plastics material.

According to FIGS. 1 and 2, profiled bars 9 are inserted in the cavities which are defined between the protruding edges 5 of the glass sheets and the sealing strips of adjacent elements 1. These bars space the edges of adjacent elements apart and may be anchored in the wall or may serve only for locking the glass sheets relative to each other. In the latter case, the bars 9 consist preferably of a heat- and sound-insulating material, such as that known under the registered trademark Styropor. The gaps 10 between the edges of the adjacent glass sheets may be filled with putty or other cement or a putting compound.

In the embodiment shown in FIG. 4, the grooves 11, 12 in the glass sheets 2, 3 are wider and are filled with a sealing or putting compound 14 on the outside of the strips 13.

What is claimed is:

1. A box girder comprising, in combination:
   (1) two spaced apart, parallel, elongated rectangular glass sheets having plane surfaces facing each other,
       (a) each sheet having a first pair of edges extending in the direction of elongation of the sheet and a second pair of edges extending perpendicularly thereto,
       (b) the second pairs of edges of the two glass sheets defining two end openings of the box girder;
   (2) the facing plane surfaces of the two glass sheets defining two pairs of grooves parallel to the first pairs of edges and spaced therefrom–
   (3) a pair of elongated sealing strips held in sealing contact with said grooves; and
   (4) profiled end covers closing the two end openings of the box girder,
       (c) at least one of the end covers being detachably mounted over the opening on one of the second pairs of edges of the glass sheets.

2. A structure comprising a plurality of box girders, each girder including, in combination;
   (1) two spaced apart, parallel, elongated rectangular glass sheets having plane surfaces facing each other,
       (a) each sheet having a first pair of edges extending in the direction of elongation of the sheet and a second pair of edges extending perpendicularly thereto,
       (b) the second pairs of edges of the two glass sheets defining two end openings of the box girder;
   (2) the facing plane surfaces of the two glass sheets defining two pairs of grooves parallel to the first pairs of edges and spaced therefrom;
   (3) a pair of elongated sealing strips held in sealing contact with said grooves;
   (4) profiled end covers closing the two end openings of the box girder,
       (c) at least one of the end covers being detachably mounted over the opening on one of the second pairs of edges of the glass sheets;
   (5) the box girders being arranged in side-by-side relationship with one of the first pairs of edges of the glass sheets of one box girder being parallel and adjacent to one of the first pairs of edges of the glass sheets of an adjacent one of the box girders,
       (d) whereby the elongated sealing strips in the grooves adjacent the last-named edges and edge portions of the glass sheets protruding beyond the grooves define a cavity between the adjacent box girders; and
   (6) a profiled spacing bar of heat-insulating and sound-proof material mounted in each of said cavities for connecting the box girders into said structure.

3. The structure of claim 2, wherein the profiled spacing bars space apart the adjacent ones of the edges of the adjacent glass sheets of the box girders.

References Cited

UNITED STATES PATENTS

| 2,228,363 | 1/1941 | Pinney | 52—308 |
| 2,618,819 | 11/1952 | Goodwillie | 52—624 |
| 3,314,204 | 4/1967 | Zopnek | 52—308 |

FOREIGN PATENTS

| 499,181 | 11/1950 | Belgium. |
| 497,991 | 1/1939 | Britain. |

HENRY C. SUTHERLAND, *Primary Examiner.*

JAMES L. RIDGILL, JR., *Examiner.*